United States Patent [19]

Bauer et al.

[11] Patent Number: 5,277,567

[45] Date of Patent: Jan. 11, 1994

[54] APPARATUS FOR MIXING REACTIVE SYNTHETIC-RESIN COMPONENTS

[75] Inventors: Adolf Bauer, Olching; Gereon Mertens, Feldafing, both of Fed. Rep. of Germany

[73] Assignee: Krauss Maffei AG, Munich, Fed. Rep. of Germany

[21] Appl. No.: 905,177

[22] Filed: Jun. 24, 1992

Related U.S. Application Data

[63] Continuation of Ser. No. 674,877, Mar. 25, 1991, abandoned.

[30] Foreign Application Priority Data

Mar. 23, 1990 [DE] Fed. Rep. of Germany ....... 4009465

[51] Int. Cl.⁵ .............................................. B29C 45/02
[52] U.S. Cl. .................................... 425/130; 264/328.4; 264/328.6; 264/328.19; 425/544; 425/557; 425/558; 425/561
[58] Field of Search ............... 425/130, 544, 557, 558, 425/560, 561; 264/328.4, 328.6, 328.8, 328.17, 328.18, 328.19

[56] References Cited

U.S. PATENT DOCUMENTS

| | | | |
|---|---|---|---|
| 4,668,460 | 5/1987 | Ongena | 264/328.8 |
| 4,721,391 | 1/1988 | Bauer | 264/328.6 |
| 4,898,714 | 2/1990 | Urban et al. | 425/544 |

FOREIGN PATENT DOCUMENTS

| | | |
|---|---|---|
| 0024330 | 8/1980 | European Pat. Off. |
| 0070486 | 7/1982 | European Pat. Off. |
| 0132443 | 7/1983 | European Pat. Off. |
| 0162130 | 11/1985 | European Pat. Off. |
| 0347712 | 12/1989 | European Pat. Off. |
| 2461925 | 11/1975 | Fed. Rep. of Germany |
| 2645937 | 4/1978 | Fed. Rep. of Germany |
| 2327269 | 4/1981 | Fed. Rep. of Germany |
| 3120482 | 1/1983 | Fed. Rep. of Germany |
| 3227186 | 1/1984 | Fed. Rep. of Germany |
| 3120482 | 5/1985 | Fed. Rep. of Germany |
| 3612125 | 10/1987 | Fed. Rep. of Germany |
| 3626990 | 2/1988 | Fed. Rep. of Germany |

*Primary Examiner*—Tim Heitbrink
*Attorney, Agent, or Firm*—Herbert Dubno; Andrew Wilford

[57] ABSTRACT

A mixing head for a mold can receive two or more reactive synthetic resin components in a mixing chamber in which a mixing-chamber piston is displaceable to drive the residues into a first calming chamber communicating with the outlet of the mixing chamber. The first calming chamber also has a piston or plunger which can be advanced to drive the residues into a second calming chamber connected to the outlet of the first calming chamber. The second calming chamber has a second piston displacing the mixture into the mold cavity. Because the pistons of the first and second calming chambers can be retracted as the mixture flows through these chambers, a highly effective calming effect can be obtained for the turbulent mixture of the mixing chamber without throttling.

16 Claims, 4 Drawing Sheets

APPARATUS FOR MIXING REACTIVE SYNTHETIC-RESIN COMPONENTS

CROSS REFERENCE TO RELATED APPLICATIONS

This application is a continuation of application 07/674,877 filed Mar. 25, 1991 now abandoned with a claim to the priority of German application 4,009,465 filed March 23, 1990.

Field of the Invention

Our present invention relates to a method of mixing at least two reactive synthetic resin components to be injected into a mold cavity in the formation of molded bodies of synthetic resin. It also relates to an apparatus for mixing two components, to a method of operating such an apparatus and, in addition, to an in-mold coating method. Specifically, this invention relates to the mixing of at least two reactive synthetic resin components under pressure utilizing a cylindrical mixing chamber having a plunger or piston which is retracted to allow the mixing to take place, but which can be advanced to drive out all of the mixture, thereby eliminating residues from the mixing chamber.

BACKGROUND OF THE INVENTION

An apparatus for the mixing of at least two reactive synthetic resin components to form a hardenable or settable mixture which can be discharged into a mold, as described in German patent document DE-PS 23 27 269, has a cylindrical reaction chamber into which the synthetic resin components are injected and from which all residues of the reactive synthetic resin mixture ca be discharged by a reversibly movable mixing-chamber piston which can be displaced within this chamber.

This apparatus is provided with a cylindrical calming chamber into which the mixing chamber is discharged and which lies at an angle to the longitudinal axis of the mixing chamber, namely, a right angle, to form the turbulent mixture discharged from the mixing chamber into a quiescent mixture before it is discharged into a mold cavity. The calming chamber also is provided with a piston or plunger which is reversibly displaceable and can drive all residues of the mixture from this chamber into a mold cavity, i.e. through the outlet of the calming chamber.

Mixing heads of this type require control of the pressure in the mixing chamber by the throttling of the mixing chamber outlet as described, for example, in the German patent document DE-PS 31 20 482. In this system, the piston or plunger of the calming chamber forms an obstructing piece at its front end directly adjacent the mixing chamber outlet and in an intermediate position in which the calming-chamber piston can be arrested. A disadvantage of this kind of throttling approach is that the output rate, i.e. the flow per unit time, through the mixing head is restricted by the throttling operation.

OBJECTS OF THE INVENTION

It is, therefore, the principal object of the present invention to provide an apparatus which has more effective control of the mixing and calming operation but which is not limited by the throttling action of the aforementioned earlier system but nevertheless has the advantageous effect of the diversion of the mixture which the throttling body of this earlier system provides.

Another object of the invention is to provide an improved method of operating an apparatus of this improved type so that the output is enhanced but the flow change effects are maintained.

It is also an object of the invention to provide an improved method of mixing two reactive synthetic resin components for discharge into a mold with improved control and quality of the mixture.

Still another object of the invention is to provide an improved method of and apparatus for the in-mold coating of molded objects.

SUMMARY OF THE INVENTION

These objects and others which will become apparent hereinafter are attained, in accordance with the present invention, in a system of the last-mentioned type in which downstream of the first calming chamber and at an angle thereto, a second calming chamber with a second reversible calming-chamber piston is provided.

More particularly, an apparatus for mixing at least two reactive synthetic resin components under high pressure can comprise:

- a cylindrical mixing chamber formed with at least one inlet through which at least two reactive synthetic resin components under high pressure can be injected, an outlet at an axial end of the mixing chamber, and a reversibly axially movable mixing-chamber piston in the mixing chamber retractable to permit mixing of the components in the mixing chamber and advanceable to drive residual reactive synthetic resin mixture out of the mixing chamber;
- a first cylindrical calming chamber communicating with the outlet of the mixing chamber and having an axis extending at an angle to an axis of the mixing chamber, the first cylindrical calming chamber reducing turbulence in the mixture as the mixture is transferred to the first calming chamber from the mixing chamber, the first calming chamber being formed with an outlet at a axial end of the first calming chamber, and a reversibly axially movable first calming chamber piston in the first calming chamber retractable to permit admission of the mixture into the first calming chamber and advanceable to drive the mixture out of the outlet of the first calming chamber; and
- a second cylindrical calming chamber communicating with the outlet of the first calming chamber and having an axis extending at an angle to an axis of the first calming chamber, the second calming chamber being formed with an outlet at an axial end of the second calming chamber from which the mixture is discharged, and a reversibly axially movable second calming chamber piston in the second calming chamber retractable to permit admission of the mixture into the second calming chamber and advanceable to drive the mixture out of the second calming chamber through the outlet thereof.

According to a feature of the invention, the cross sectional area of the second calming chamber is at least equal to the cross sectional area of the first calming chamber, i.e. is equal to or greater than the latter cross sectional area. However, the cross sectional area of the second calming chamber can be smaller than the cross sectional area of the first calming chamber if desired.

The cross sectional area of the first calming chamber is at least equal to the cross sectional area of the mixing chamber, i.e. is equal to or greater than the cross sectional area of the mixing chamber.

The first calming chamber has at least one injection opening and preferably two injection openings controlled by the first calming-chamber piston for injecting one or more additional components into the mixture, e.g. two components which can react to form the coating mixture for in-mold coating.

The mixing chamber can open into the first calming chamber at an angle ranging from an acute angle to an obtuse angle and the first calming chamber can open into the second calming chamber at an angle ranging from an acute angle to an obtuse angle.

The axes of the first and second calming chambers can lie in a plane and the axis of the mixing chamber can lie in this plane or can include an angle with this plane.

A plurality of such mixing chambers can open into the first calming chamber and the sum of the cross sectional areas of the mixing chambers can be at least equal to the cross sectional area of the first calming chamber. The second calming chamber can have a mixture volume corresponding to a volume of a workpiece to be formed by the mixture in the mold cavity into which the outlet of the second calming chamber can open. The second calming chamber can have a reduced cross sectional area corresponding to an increased stroke of the second calming-chamber piston over the strokes of the pistons for the first calming chamber and the mixing chamber. Advantageously, the outlet of the first calming chamber opens directly at and into the outlet of the second calming chamber.

It has been found to be advantageous to provide a closure slider at the outlet of the second calming chamber. The outlet of the second calming chamber can be provided with a fitting connecting it to a mold having a mold cavity into which the mixture is discharged, the fitting being provided with the closure slider for separating the second calming chamber from the mold cavity.

At least one of the first and second calming-chamber pistons is formed with a piston head having a diameter corresponding to the diameter of the respective chamber and a portion rearwardly of the head of a reduced diameter. That piston head can be provided with an adjustable ring seal. At least one of the calming chambers is formed with a portion widening into a collecting chamber opposite the respective outlet.

The invention also involves a method of fabricating a molded article or of operating that apparatus which comprises the steps of:

(a) providing a mold having a mold cavity;
(b) injecting into the mold a body of a hardenable material forming a substrate to be coated in the mold with a given volume of a coating mixture;
(c) introducing reactive components of the mixture into a cylindrical mixing chamber formed with at least one inlet through which at least two reactive synthetic resin components under high pressure can be injected, an outlet at an axial end of the mixing chamber, and a reversibly axially movable mixing-chamber piston in the mixing chamber retractable to permit mixing of the components in the mixing chamber and advanceable to drive residual reactive synthetic resin mixture out of the mixing chamber, thereby mixing the components in the mixing chamber;
(d) transferring the mixture to a first cylindrical calming chamber communicating with the outlet of the mixing chamber and having an axis extending at an angle to an axis of the mixing chamber, the first cylindrical calming chamber reducing turbulence in the mixture as the mixture is transferred to the first calming chamber from the mixing chamber, the first calming chamber being formed with an outlet at an axial end of the first calming chamber, and a reversibly axially movable first calming chamber piston in the first calming chamber retractable to permit admission of the mixture into the first calming chamber and advanceable to drive the mixture out of the outlet of the first calming chamber;
(e) displacing the mixture from the first calming chamber to a second cylindrical calming chamber communicating with the outlet of the first calming chamber and having an axis extending at an angle to an axis of the first calming chamber, the second calming chamber being formed with an outlet at an axial end of the second calming chamber from which the mixture is discharged, and a reversibly axially movable second calming chamber piston in the second calming chamber retractable to permit admission of the mixture into the second calming chamber and advanceable to drive the mixture out of the second calming chamber through the outlet thereof into the mold cavity, the second piston being retracted during the displacement of the mixture into the second chamber to permit the volume of the mixture to be accommodated in the second chamber;
(f) closing the first chamber with the first piston when the volume of the mixture is accommodated in the second chamber; and
(g) displacing the volume of the mixture from the second chamber into the mold cavity by advancing the second piston to coat the substrate by in-mold coating.

Alternatively the method can comprise the steps of:
(a) providing a mold having a mold cavity;
(b) injecting into the mold a body of a hardenable material forming a substrate to be coated in the mold with a given volume of a coating mixture by:
   (b₁) introducing reactive components of adapted to form the hardenable material into a cylindrical mixing chamber formed with at least one inlet through which at least the reactive components can be injected under high pressure, an outlet at an axial end of the mixing chamber, and a reversibly axially movable mixing-chamber piston in the mixing chamber retractable to permit mixing of the components in the mixing chamber and advanceable to drive residual reactive mixture out of the mixing chamber, thereby mixing the components in the mixing chamber,
   (b₂) transferring the mixture to a first cylindrical calming chamber communicating with the outlet of the mixing chamber and having an axis extending at an angle to an axis of the mixing chamber, the first cylindrical calming chamber reducing turbulence in the mixture as the mixture is transferred to the first calming chamber from the mixing chamber, the first calming chamber being formed with an outlet at an axial end of the first calming chamber, and a reversibly axially movable first calming chamber piston in the first calming chamber retractable to permit admission of the mixture into the first calming chamber and advanceable to drive the mixture out of the outlet of the first calming chamber, (b₃) displacing the mixture from the first calming chamber to a second cylindrical calming chamber communicating with the outlet of the first calming chamber and having an axis extending at an angle to an axis of the first calming chamber, the second calming chamber being formed with an outlet at an axial end of the second calming chamber from which the mixture is discharged, and a reversibly axially movable second calming chamber piston in the second calming chamber retractable to permit admission of the mixture into the second calming chamber and advanceable to drive the mixture out of the second calming chamber through the outlet thereof into the mold cavity, and (b₄) displacing the mixture from the second chamber into the mold cavity by advancing the second piston, thereby forming a substrate in the mold cavity to be coated with the volume of coating mixture; and (c) injecting the volume of the coating mixture into the mold cavity by:

(c₁) while the mixing chamber is closed off by the mixing piston, introducing reactive components forming the coating mixture into the first calming chamber, thereby mixing the reactive components of the coating mixture therein, (c₂) displacing the coating mixture from the first calming chamber to the second cylindrical calming chamber, the second piston being retracted during the displacement of the coating mixture into the second chamber to permit the volume of the coating mixture to be accommodated in the second chamber, (c₃) closing the first chamber with the first piston when the volume of the coating mixture is accommodated in the second chamber, and (c₄) displacing the volume of the coating mixture from the second chamber into the mold cavity by advancing the second piston to coat the substrate by in-mold coating.

As a rule, the cross sections of the first and second calming chambers which are disposed downstream of the mixing chamber will be greater than the cross section of the preceding chamber. In a particularly advantageous embodiment, the cross section of the second calming chamber, however, can be equal to or smaller than that of the first calming chamber without interfering with the output flow rate and while providing a thorough mixing because of the double deflection of the pressure in the mixing chamber in a manner similar to that which is achieved by the throttling action described in connection with German patent document DE-PS 31 20 482.

In the first embodiment of the invention, further reactive components can be injected into the first calming chamber so that the first calming chamber becomes a mixing chamber for these additional components which can be controlled by the piston of the first chamber.

The two or more additional components, for example, lacquer components, can then be injected into the mold directly for in-mold coating of a substrate previously formed in the mold cavity utilizing principles described, for example, in U.S. Pat. No. 4,668,460.

The substrate will generally then be formed by injecting in a prior step, the reactive mixture formed in the mixing chamber, through the two calming chambers, into the mold cavity to form the substrate or base material to be subjected to in-mold coating. This article can be a bumper of an automotive vehicle or a push rod. In the fabrication of the bumper, therefore, the substrate is first formed in the mixing chamber and is then coated with the reactive lacquer from the components mixed in the first calming chamber, in a second stage.

In all cases, it has been found to be advantageous to retract the piston or plunger of the second calming chamber as the mixture is displaced into it from the first calming chamber to an extent such that the volume in the second calming chamber is completely filled with the reactive mixture and corresponds to the volume of the coating to be applied in the mold. The outlet of the second calming chamber can be closed off during this period and once the outlet is opened, the mixture can be driven into the mold cavity at a high pressure of 250 to 1,000 bar.

The first calming chamber is closed off from the second calming chamber when the piston of the latter is driven with the high force necessary to generate this pressure. At this high pressure, the lacquer mixture can be uniformly distributed over the substrate to completely coat the latter.

The in-mold coating process can be used where the substrate, for example, the bumper is formed by some other process and is placed in or is originally in a mold. For example, the substrate or bumper may be formed by an injection molding machine from a thermoplastic synthetic resin or by a polyurethane injection molding machine. In a subsequent step, according to the invention, the lacquer component mixture is formed utilizing the apparatus described, but not in the first calming chamber but rather in the mixing chamber to be delivered to the mold through the two calming chambers in the manner described. The second calming chamber is here used as a storage reservoir to allow pressurization of the mixture at high pressures when the first calming chamber is closed off, whereupon the mixture is displaced into the mold cavity to coat the object previously formed therein.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

Figure 1:
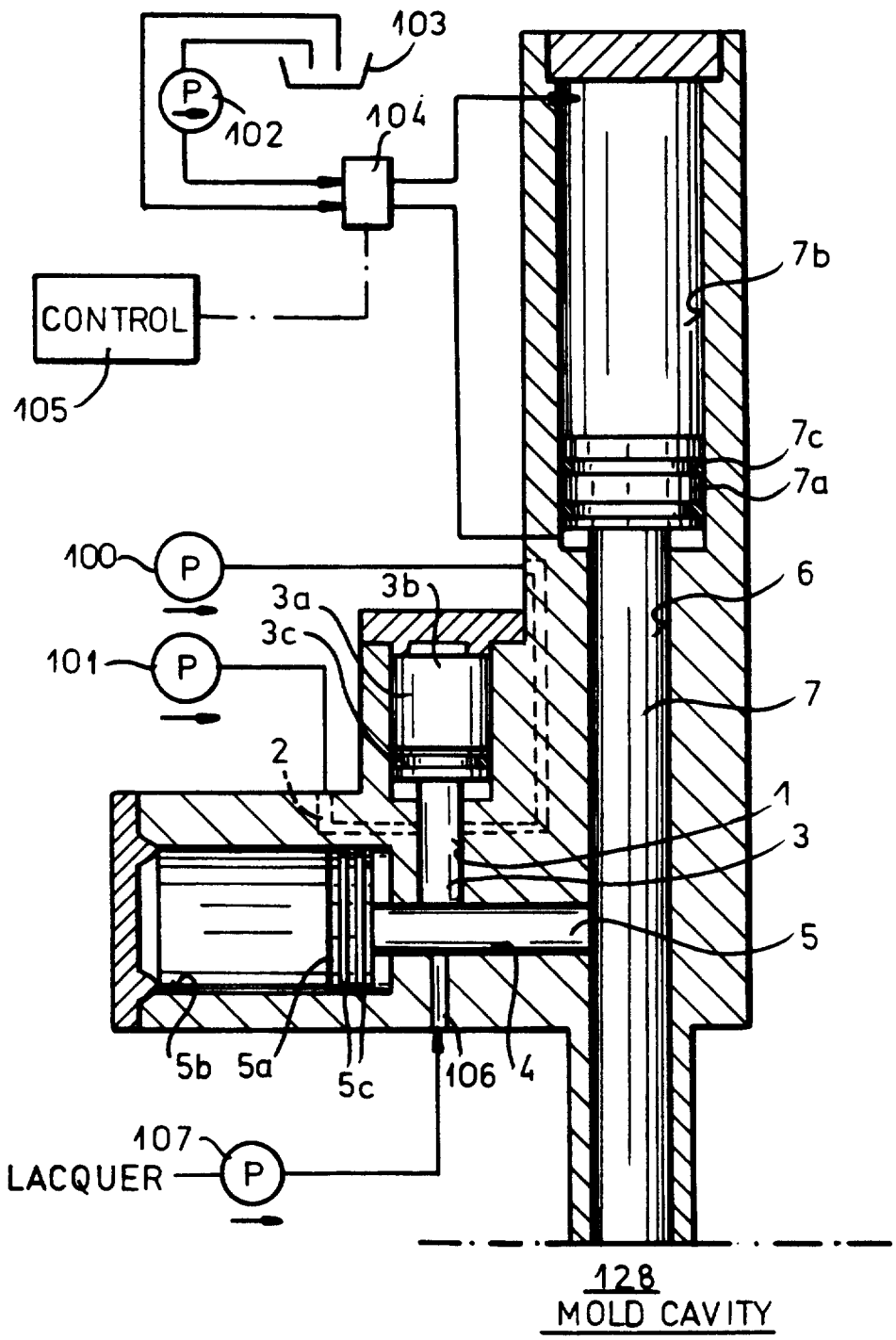
FIG. 1 is a schematic cross sectional view of a mixing head having a mixing chamber and first and second calming chambers according to the invention.

The mixing head shown in FIG. 1 comprises a mixing chamber 1 in which injection openings for the supply of two or more chemically reactive synthetic resin components can open. These inlets are shown at 2 and each can be connected to a respective pump 100, 101 for supplying the synthetic resin component under high pressure so that a mixture of the two components will turbulently form when the mixing-chamber piston 3 is retracted. The inlets 2 are aligned with one another but are opposite one another across the chamber 1. When the piston 3 is advanced, it can block these openings and with further advance, drive all residues of the mixture into a first calming chamber 4.

The piston 3 is provided with a piston head 3a which is reciprocatable in a cylinder 3b and has a sealing ring 3c. The actuation of the mixing piston 3 can be effected by means similar to those or common to those described with respect to the second calming cylinder below.

As noted, the mixing chamber 1 opens into a first cylindrical calming chamber 4 in which a first calming-chamber piston 5 is reversibly displaceable. The first calming chamber 4 communicates with a second calming chamber 6 in which a second calming-chamber piston 7 is reversibly displaceable. The cross sectional area of the second calming chamber 6 is greater than that of the first calming chamber 4 and the cross sectional area of the first calming chamber 4 can have be greater than that of the mixing chamber 1. In FIG. 1 the mixing chamber piston 3 and the first and second pistons 5 and 7 are shown in their fully-closed positions in which they remain after having displaced all residues of the mixture from the respective chambers.

The first piston 5 has a piston head 5a displaceable in the cylinder 5b and is provided with sealing rings 5c. Similarly, the piston 7 has a piston head 7a reversibly displaceable in a cylinder 7b and is provided with sealing rings 7c. The displacement of the pistons can be effected hydraulically and for that purpose a hydraulic pump 102 can be provided.

The pump can draw the hydraulic medium from a reservoir 103 and feed it to a reversing valve 104 operated by a controller 105. The cylinder 7b functions as a double-acting cylinder to which fluid may flow on either side of the head 7a from the valve 104 and will return to the reservoir 103 from the opposite side of the head.

The pump and reservoir may be common to the other cylinders 3b and 5b as well, although these cylinders generally will be provided with respective valves 104. According to a feature of the invention, lacquer can be fed to a port 106 opening into the chamber 4 under the control of the piston 5 from a pump 107. Alternatively, a plurality of reactive lacquer components can be fed to the first calming chamber, as will be described in connection with FIG. 5, if the lacquer mixture to be applied by in-mold coating to the previously formed workpiece is to be formed in the first calming chamber.

Before metering of the reactive synthetic resin components into the chamber 1, the first and second pistons 5 and 7 are retracted to permit the first and second calming chambers 4 and 6 to receive the mixture.

The mixing-chamber piston 3 is then retracted so that the synthetic resin components can be injected into the mixing chamber 1 and can intimately mix therein. The mixture flows to the first calming chamber 4 and then to the second calming chamber 6 and from the latter into the mold cavity which has been illustrated diagrammatically at 128.

At the end of the charge, the piston 3 is first advanced to drive all residues of the mixture out of the mixing chamber 1. Immediately thereafter the first piston 5 of the first calming chamber 4 is advanced to drive all residues of the synthetic resin out of the calming chamber 4. Then the second piston 7 is advanced to displace the mixture fully into the mold cavity. Since the flow cross section of the second calming chamber 6 can be selected without limitation, no throttling need be effected between the first and second calming chambers.

The pistons 5 and 7 can be retracted for in-mold coating of the previously formed body, thereby unblocking the port 10 through which the coating lacquer is injected. The coating lacquer can then be driven by the pistons 5 and 7 into the mold cavity. In that case, the piston 7 generates the injection pressure required for the in-mold coating.

Figure 2:
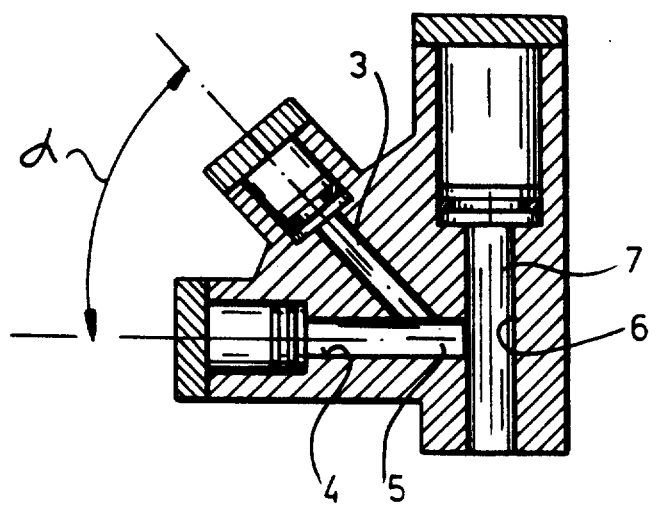
FIG. 2 is a schematic illustration in cross section of an arrangement of the mixing chamber and first and second calming chambers in which the mixing chamber and first calming chamber are at an acute angle to one another and the second calming chamber is at a right angle to the first calming chamber, the chamber axes being coplanar.
Figure 3:
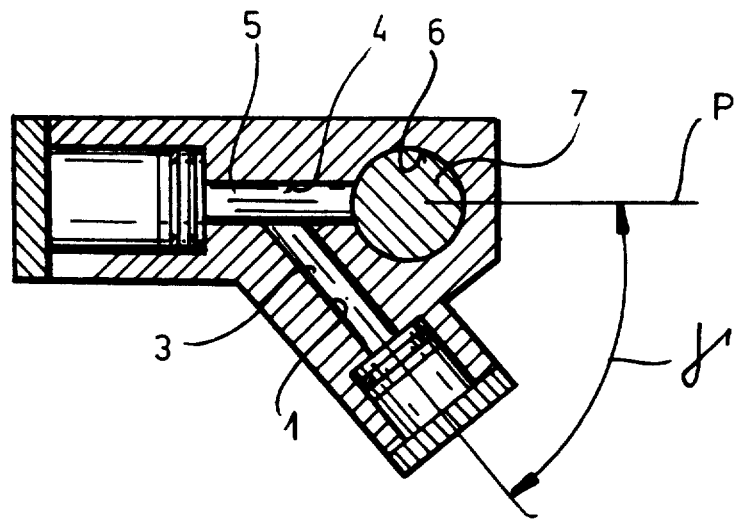
FIG. 3 is an illustration showing a modification of the embodiment of FIG. 2 wherein the mixing chamber is oriented at an angle to the plane of the axes of the first and second calming chambers.

As can be seen from FIG. 2, the axes of all of the cylinders and their respective pistons 3, 5, 7 can be coplanar and the axes of the mixing chamber and the first calming chamber can include an acute angle $\alpha$ with one another. The angle between the calming chambers 4 and 6 is a right angle in the embodiment of FIG. 2. In the embodiment of FIG. 3, the mixing chamber 1 includes an acute angle $\gamma$ with the plane P of the axes of the first and second calming chambers 4 and 6.

Although a plurality of mixing chambers has not been shown in these Figures, it will be understood that a plurality of such mixing chambers can communicate with the first calming chamber 4.

In a similar manner, an acute or obtuse angle $\beta$ can be formed between the first and second calming chambers 4 and 6. The angles $\alpha$ and $\beta$ of course, can be selected to ensure optimum calming of the turbulent flow from the mixing chamber. As a rule, a right angle between the calming chambers will suffice.

Figure 4:
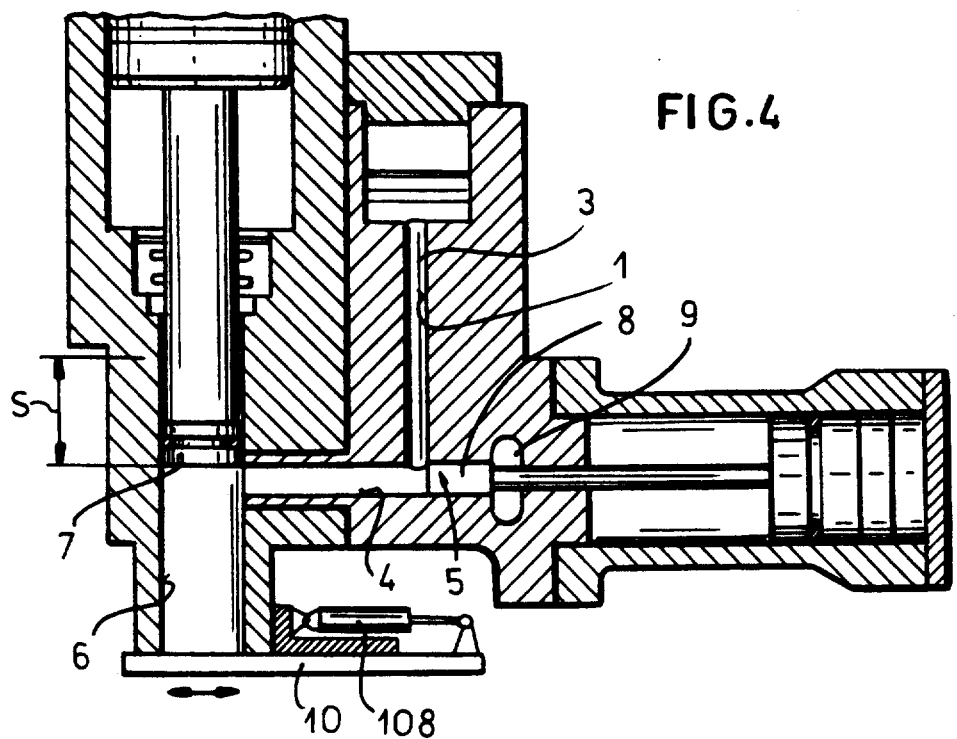
FIG. 4 is an axial cross sectional view of a mixing head operating under the same principles as that of FIG. 1 but having a first calming chamber provided with a collecting compartment and a closure slider at the outlet opening of the second calming chamber.

As can be seen from FIG. 4, a mixing head generally utilizing the principles of that of FIG. 1 can be especially designed for in-mold coating. In this case, the first piston 5 and the first calming chamber 4 has a piston head 8 and behind the piston head 8 has a reduced diameter. The first calming chamber 4 is formed rearwardly of this head with a collecting chamber 9 which can be blown out by compressed air from a source, not shown.

The second calming chamber 6 and the second calming-chamber piston 7 are so formed that, above the outlet opening of the first calming chamber 4, a storage volume sufficient to receive the entire quantity of the material necessary for in-mold coating is provided. The retraction of the piston 7 can thus adjust this storage volume. At the outlet opening of the second calming chamber, a closure slider 10 is provided.

With operation in accordance with the in-mold coating method using this system, another mixing head can be utilized to first form the substrate in the mold cavity and, in that case, the coating mixture can be formed in the mixing chamber 1 and delivered to the first calming chamber 4 by the techniques previously described.

The mixture is permitted to fill into the second calming chamber 6 while the plate 10 blocks the outlet from this chamber. The pressure in the second calming chamber 6 is developed after the piston 5 has closed and the plate 10 can then be withdrawn, e.g. via a hydraulic cylinder 108.

In that embodiment, the mixing head shown in FIG. 4 is connected to the mold cavity after the workpiece has been formed by the first mixing head.

The piston 7, of course, drives the entire volume of the coating mixture into the mold cavity with high pressure, for example 1,000 bar. At this high pressure, a uniform coating of the workpiece in the mold cavity can be obtained.

At this high pressure it is possible that there will be some leakage of the mixture past the piston head 8. This leakage collects in the chamber 9 upon retraction of the piston 8 and can be blown out of the latter. The piston 7 and the second calming chamber 6 can be similarly constructed so that any leakage past the second piston 7 can be eliminated.

Figure 5:
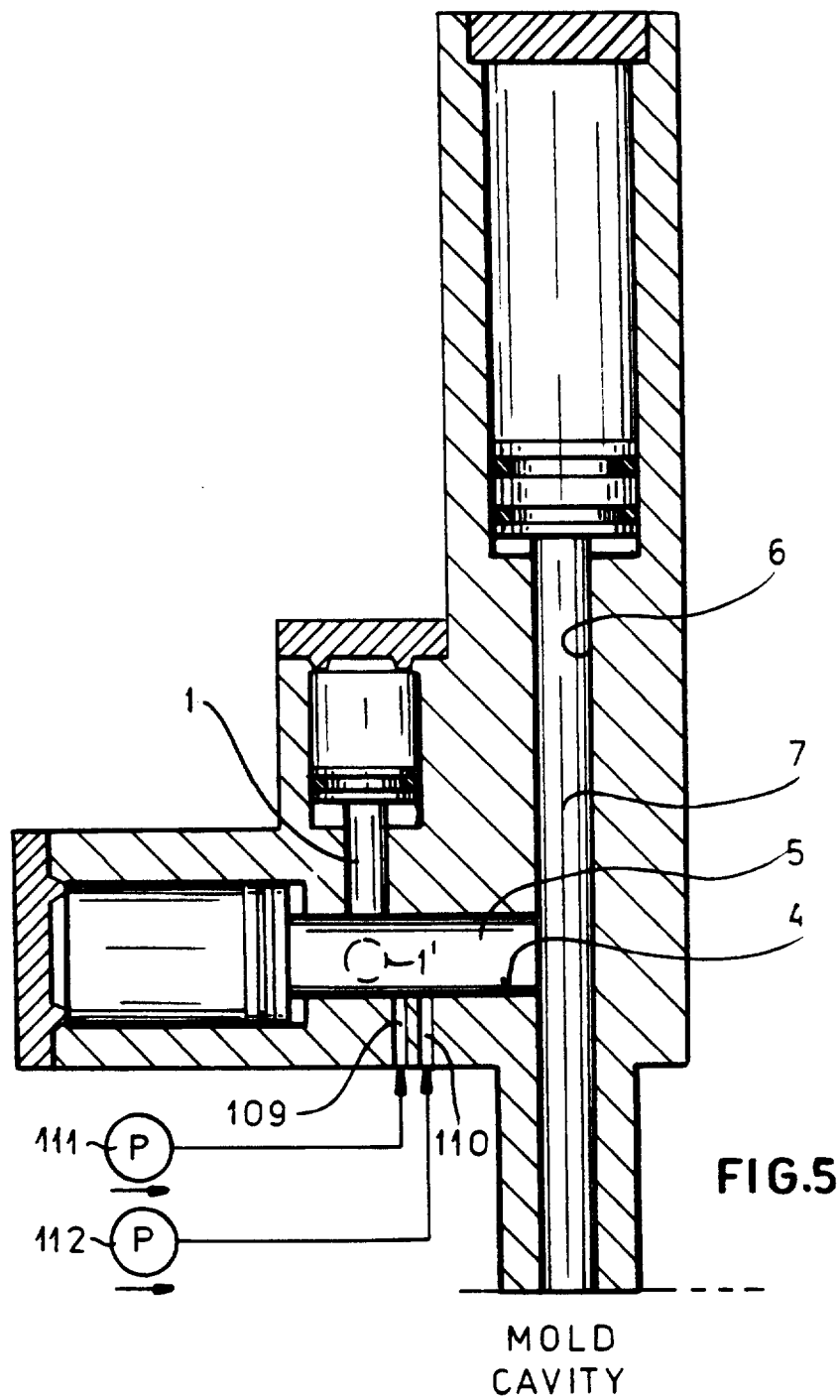
FIG. 5 is a cross sectional view generally similar to FIG. 1 but illustrating another embodiment of the invention.

In FIG. 5 we have shown a system in which ports 109 and 110 are provided in the chamber 4 for the delivery of reactive lacquer components by pumps 111 and 112. We have also shown an opening 1' from a second mixing chamber. Otherwise the system of FIG. 5 is similar to that of FIGS. 1 and 4.

Figure 6:
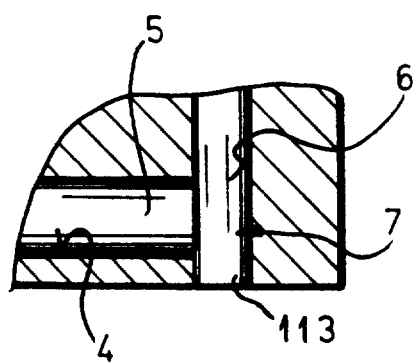
FIG. 6 is a detail view showing an arrangement in which the first calming chamber opens into the second calming chamber at the outlet thereof.
Figure 7:
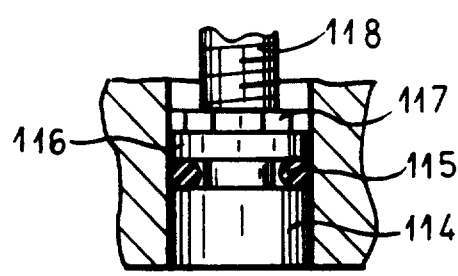
FIG. 7 is a detail view showing an adjustable seal arrangement which can be used with the piston head of FIG. 4 or with piston heads which can be provided on any of the pistons of this application.

In FIG. 6 we have shown an arrangement in which the first calming chamber 4 opens into the second calming chamber 6 at the outlet 113 thereof. In FIG. 7 there is shown an arrangement in which a piston head 114 such as the piston head 8 or similar piston heads on the pistons 1 and 7 can have adjustable ring seals.

In this embodiment, the piston 114 forms one seat for an O-ring seal 115 which can be pressed by the disk 116 controlled by a nut 117 screwed onto a threaded shank 118 of the piston. By rotation of the nut 117, the pressure with which the ring 115 is pressed outwardly can be adjusted.

We claim:

1. An apparatus for mixing at least two reactive synthetic resin components under high pressure, the apparatus comprising:
   a cylindrical mixing chamber centered on an axis and formed with
      two inlets opening opposite one another across said mixing chamber, and
      an outlet at an axial end of the mixing chamber;
   respective means connected to the inlets for introducing respective reactive synthetic-resin components therethrough under high pressure into the mixing chamber;
   a reversibly axially movable mixing-chamber piston in the mixing chamber retractable to permit mixing of the components in the mixing chamber and axially toward the outlet advanceable to drive the mixture out of the outlet of the mixing chamber;
   a first cylindrical calming chamber communicating with the outlet of the mixing chamber and having an axis extending at an angle to the mixing-chamber axis, the first cylindrical calming chamber reducing turbulence in the mixture as the mixture is transferred to the first calming chamber from the mixing chamber, the first calming chamber being formed with an outlet at an axial end of the first calming chamber;
   a reversibly axially movable first calming chamber piston in the first calming chamber retractable past said outlet of said mixing chamber to permit admission of the mixture into the first calming chamber and advanceable axially across said outlet of said mixing chamber to drive the mixture out of the outlet of the first calming chamber;
   a second cylindrical calming chamber communicating with the outlet of the first calming chamber and having an axis extending at an angle to the axis of the first calming chamber, the second calming chamber being formed with an outlet at an axial end of the second calming chamber from which the mixture is dischargeable;
   a reversibly axially movable second calming chamber piston in the second calming chamber axially retractable past said outlet of said first calming chamber to permit admission of the mixture into the second calming chamber and advanceable across said outlet of said first calming chamber to drive the mixture out of the second calming chamber through the outlet thereof, the outlet of the second cylindrical calming chamber opening axially into a mold cavity, a cross sectional area of the second calming chamber being greater than a cross sectional area of the first calming chamber, the cross sectional area of the first calming chamber being at least equal to a cross sectional area of the mixing chamber, the first calming chamber having at least one injection opening controlled by the first calming chamber piston and on a side opposite said outlet of said mixing chamber; and
   means for injecting at least one additional component into the mixture through the injection opening of the first calming chamber.

2. The apparatus defined in claim 1 wherein the mixture chamber opens into the first calming chamber at an angle $\alpha$ ranging from an acute angle to an obtuse angle.

3. The apparatus defined in claim 1 wherein the first calming chamber opens into the second calming chamber at an angle $\beta$ ranging from an acute angle to an obtuse angle.

4. The apparatus defined in claim 1 wherein the axes of the chambers are coplanar.

5. The apparatus defined in claim 1 wherein the axes of the first and second calming chambers lie in a plane and the axis of the mixing chamber includes an angle $\gamma$ with this plane.

6. the apparatus defined in claim 1 wherein a plurality of the mixing chambers open into the first calming chamber and a sum of cross sectional areas of the mixing chambers is at least equal to a cross sectional area of the first calming chamber.

7. The apparatus defined in claim 1 wherein the second calming chamber has a mixture volume corresponding to a volume of a workpiece to be formed by the mixture in a mold cavity into which the outlet of the second calming chamber opens.

8. The apparatus defined in claim 7 wherein the second calming chamber has a reduced cross sectional area corresponding to an increased stroke for the second calming chamber piston over those of the first calming chamber and the mixing chamber.

9. The apparatus defined in claim 8 wherein the outlet of the first calming chamber opens at and into the outlet of the second calming chamber.

10. The apparatus defined in claim 8, further comprising
a closure slider at the outlet of the second calming chamber.

11. The apparatus defined in claim 1 wherein the outlet of the second calming chamber is provided with a fitting connecting it to a mold having the mold cavity into which the mixture is discharged, the fitting being provided with a closure slider for separating the second calming chamber from the mold cavity.

12. The apparatus defined in claim 1 wherein the first calming chamber is formed with two spaced-apart inlets, the apparatus further comprising
means for injecting at least two further reactive components into the first calming chamber through the respective spaced-apart inlets upon blocking of the mixing chamber.

13. The apparatus defined in claim 1 wherein at least one of the first and second pistons is formed with a piston head having a diameter corresponding to the diameter of the respective chamber and a portion rearwardly of the head of a reduced diameter.

14. The apparatus defined in claim 13 wherein the piston head is provided with an adjustable ring seal.

15. The apparatus defined in claim 13 wherein at least one of the calming chambers is formed with a portion widening into a collecting chamber opposite the respective outlet.

16. The apparatus defined in claim 1 wherein the chambers have respective volumes when the respective pistons are fully retracted, the volume of the second calming chamber being greater than that of the first calming chamber which is greater than that of the mixing chamber.

* * * * *